(12) United States Patent
Pollard et al.

(10) Patent No.: US 11,062,376 B1
(45) Date of Patent: Jul. 13, 2021

(54) DATA ENGINE FOR GRAPH BASED ANALYSIS

(71) Applicant: United Services Automobile Association (USAA), San Antonio, TX (US)

(72) Inventors: Heather C. Pollard, Fair Oaks Ranch, TX (US); Cathy F. O'Sullivan, San Antonio, TX (US); Robert S. Welborn, III, San Antonio, TX (US); Frank DeVilbiss, San Antonio, TX (US); Robert Dohner, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 338 days.

(21) Appl. No.: 15/430,118

(22) Filed: Feb. 10, 2017

Related U.S. Application Data

(60) Provisional application No. 62/294,099, filed on Feb. 11, 2016.

(51) Int. Cl.
| | | |
|---|---|---|
| *G06Q 30/00* | (2012.01) | |
| *G06Q 30/06* | (2012.01) | |
| *G06F 3/0482* | (2013.01) | |
| *G06F 7/02* | (2006.01) | |

(52) U.S. Cl.
CPC ....... *G06Q 30/0631* (2013.01); *G06F 3/0482* (2013.01); *G06F 7/02* (2013.01); *G06Q 30/0627* (2013.01); *G06Q 30/0641* (2013.01)

(58) Field of Classification Search
CPC .... G06Q 30/0601–0645; G06F 3/0482; G06F 7/02

USPC .................................................. 705/26.1–27.2
See application file for complete search history.

(56) References Cited

U.S. PATENT DOCUMENTS

| | | | | |
|---|---|---|---|---|
| 10,127,596 B1 * | 11/2018 | Franke | ................... | G06Q 30/02 |
| | | | | 705/26.1 |
| 10,366,442 B1 * | 7/2019 | Oczkowski | ........ | G06Q 30/0633 |
| 2009/0254454 A1 * | 10/2009 | Gupta | ................... | G06F 16/355 |

(Continued)

OTHER PUBLICATIONS

Li, L. (2014). Next generation of recommender systems: Algorithms and applications (Order No. 3644780). Available from ProQuest Dissertations and Theses Professional. (1637726683). (Year: 2014).*

(Continued)

*Primary Examiner* — Resha Desai
*Assistant Examiner* — Kennedy Gibson-Wynn
(74) *Attorney, Agent, or Firm* — Fish & Richardson P.C.

(57) ABSTRACT

Techniques are described for analyzing data regarding users and purchasable items, and providing user experiences to users regarding the buying, leasing, and/or selling of item(s), the history of item(s), and/or other services associated with the item(s). Data may be analyzed by a data engine that provides output to power multiple user experiences (e.g., user interfaces). Such user experiences may include providing a user with recommendation(s) of items that may be of interest to the user. Recommendations may be determined using one or more algorithms, such as a content-based, criteria-based, and/or collaborative algorithm. The recommendation(s) may be presented to the user through a search user interface.

20 Claims, 10 Drawing Sheets

(56) References Cited

U.S. PATENT DOCUMENTS

| | | | | |
|---|---|---|---|---|
| 2010/0312724 | A1* | 12/2010 | Pinckney | G06N 5/02 |
| | | | | 706/11 |
| 2012/0278127 | A1* | 11/2012 | Kirakosyan | G06Q 30/00 |
| | | | | 705/7.29 |
| 2013/0325627 | A1* | 12/2013 | Kimmerling | G06F 17/30 |
| | | | | 705/24.66 |
| 2014/0181204 | A1* | 6/2014 | Sharp | H04L 67/22 |
| | | | | 709/204 |
| 2014/0188665 | A1* | 7/2014 | Baker | G06Q 30/0625 |
| | | | | 705/26.62 |
| 2014/0279263 | A1* | 9/2014 | Liu | G06Q 30/0627 |
| | | | | 705/26.63 |
| 2014/0317031 | A1* | 10/2014 | Babenko | G06N 5/02 |
| | | | | 706/12 |
| 2015/0149484 | A1* | 5/2015 | Kelley | G06F 16/9535 |
| | | | | 707/767 |
| 2016/0086250 | A1* | 3/2016 | Gunjan | G06Q 30/0631 |
| | | | | 705/26.7 |
| 2016/0350834 | A1* | 12/2016 | Wilson | G06Q 30/0631 |
| 2016/0364783 | A1* | 12/2016 | Ramanuja | G06Q 30/0631 |
| | | | | 705/26.7 |

OTHER PUBLICATIONS

Ghahramani, Z. Probabilistic machine learning and artificial intelligence. Nature 521, 452-459 (2015). https://doi.org/10.1038/nature14541 (Year: 2015).*

* cited by examiner

Item profile 124(1)

```
      name   Comfort  Holds_value  Affordable    Quality  Reputation  \
      AB12   0.521107     0.497368   -0.762925   0.504554    0.799825

Reliable      Safe  Fuel_efficient  Spacious      Urban  Commuting  \
  0.547962  0.267289       -0.619493  0.768382  -1.111526    -0.2295

Towing  Carpooling   Practical     Sporty  Family_friendly    Unique  \
  1.294004    0.440083   -0.321047  -0.461812        -0.278325  0.501009

Luxury
  0.53706
```

Item profile 124(2)

```
      name   Comfort  Holds_value  Affordable    Quality  Reputation  \
      BC23   1.403107     0.021988    -1.12335   1.855798    1.015468

Reliable      Safe  Fuel_efficient  Spacious      Urban  Commuting  \
 -0.451409  1.142881       -0.674411  0.153189  -0.108811   0.180133

Towing  Carpooling   Practical    Sporty  Family_friendly    Unique  \
 -0.718901    0.909641   -2.459317  1.049598         -0.43214   1.74494

Luxury
  2.044014
```

Item profile 124(3)

```
      name   Comfort  Holds_value  Affordable    Quality  \
      CD34   0.220109    -1.05391    0.262851  -0.684107

Reputation  Reliable      Safe  Fuel_efficient  Spacious      Urban  \
   -1.42003  -1.860283 -0.999464       -1.196135  0.738136  -0.617027

Commuting    Towing  Carpooling   Practical    Sporty  Family_friendly  \
 -2.159862 -0.236819    1.568185    1.298879 -1.131424         1.195526

Unique    Luxury
 -1.643858  -0.874267
```

Criterion 302
Criterion score 304

FIG. 3

DATA ENGINE FOR GRAPH BASED ANALYSIS

CROSS-REFERENCE TO RELATED APPLICATION

The present disclosure is related to, and claims priority from, U.S. Provisional Patent Application Ser. No. 62/294,099, titled "Data Engine for Graph Based Analysis," which was filed on Feb. 11, 2016, the entirety of which is hereby incorporated by reference into the present disclosure.

BACKGROUND

Traditional product search interfaces may enable a customer to search for products by entering search terms from a limited set of supported terms. For example, when searching for a car online, a user may be limited to search terms that describe the make, model, color, and year of the vehicle. Such a search may be inadequate for customers who lack knowledge of cars do not know the particular car they want to purchase.

SUMMARY

Implementations of the present disclosure are generally directed to analyzing data regarding users and items, and providing user experiences to users regarding the acquisition of the item(s), the history of item(s), and/or other services associated with the item(s). More specifically, implementations are directed to determining item recommendations for a user, where such recommendations are determined through one or more of a content-based algorithm, a criteria-based algorithm, or a collaborative algorithm.

In general, innovative aspects of the subject matter described in this specification can be embodied in methods that includes actions of: receiving one or more search criteria specified by a user through a user interface (UI) executing on a user device; determining an item score for each of the items, the item score for a respective item being associated with the user and determined based on a correspondence between the one or more search criteria and a plurality of criteria scores for the respective item, wherein the plurality of criteria scores is accessed from an item profile that describes, for the respective item, the plurality of criteria scores for a plurality of criteria; determining a predicted affinity of the user for each of the items, the predicted affinity determined through operation of a classifier that is trained based at least partly on item data indicating at least one technical specification for each of the items; determining a set of recommendations including one or more of the items, the set of recommendations determined based at least partly on the item score for each of the items and the predicted affinity of the user for each of the items; and transmitting a set of recommendations for presentation in the UI executing on the user device.

Implementations can optionally include one or more of the following features: the set of recommendations is ordered according to the item score for each of the one or more items; determining the item score for the respective item further includes calculating an average of the plurality of criteria scores that are included in the item profile for the respective item and that correspond to the one or more search criteria; the actions further include receiving user input indicating an affinity of the user for at least one of the items; the actions further include training the classifier based at least partly on the user input and the item data; the actions further include determining a graph that includes a user node corresponding to the user and one or more item nodes corresponding to the one or more other items, wherein the user node is connected to each of the one or more item nodes by an edge that indicates the predicted affinity of the user for the corresponding item; determining the set of recommendations is further based at least partly on the graph; the graph further includes one or more criterion nodes corresponding to the one or more search criteria; the user node is connected to each of the one or more criterion nodes by an edge that indicates that the user specified the corresponding search criterion; the actions further include receiving user input indicating an affinity of the user for one or more items; the actions further include determining an association between the user and a second user based at least partly on an affinity of the second user for the one or more items; the actions further include identifying one or more other items for which the second user has indicated an affinity and for which the user has not indicated an affinity; determining the set of recommendations is further based at least partly on the affinity of the second user for the one or more other items; the actions further include determining a graph that includes a first user node corresponding to the user, a second user node corresponding to the second user, one or more first item nodes corresponding to the one or more items for which the user and the second user have indicated the affinity, one or more second item nodes corresponding to the one or more other items for which the second user has indicated the affinity, one or more first edges connecting the first user node to the one or more first item nodes to indicate the affinity of the user for the one or more items, one or more second edges connecting the second user node to the one or more first item nodes and the one or more second item nodes to indicate the affinity of the second user for the one or more items and the one or more other items, and/or a third edge connecting the first user node to the second user node, the third edge indicating an association between the user and the second user; determining the set of recommendations is further based at least partly on the graph; and/or the plurality of items includes at least one vehicle.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or improvements over traditional techniques. By providing a search interface that presents item recommendations determined based on one or more of a criteria-based algorithm, a content-based algorithm, or a collaborative algorithm, implementations provide an advantage over traditional item search systems that are limited to traditional term-based searches. Moreover, by enabling users to search for items based on natural language and/or plain language criteria, implementations provide recommendations that may correspond to emotions, moods, lifestyle aspirations, or other aspects that may not be accurately captured by technical search terms supported by other item search systems. By using the various recommendation determination algorithms described herein, alone or in combination, implementations may provide recommendations that are more useful to users and that are more attuned to the users' personalities than those provided by traditional item search systems. Implementations may also provide useful recommendations more quickly than a traditional search system which may require multiple search attempts to reach a useful set of recommendations. Accordingly, implementations provide a technical advantage over traditional search systems which may require a greater number of less accurate searches before reaching a useful set of recommendations, if at all. In particular, systems the operate according to the implementations described herein thus may consume less processing power, less memory, less network bandwidth, and less storage space than traditional search systems which take longer to provide results that are helpful for users.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 3 depicts an example of item profiles that may be employed to determine item recommendations for a user, according to implementations of the present disclosure.

DETAILED DESCRIPTION

Figure 1:
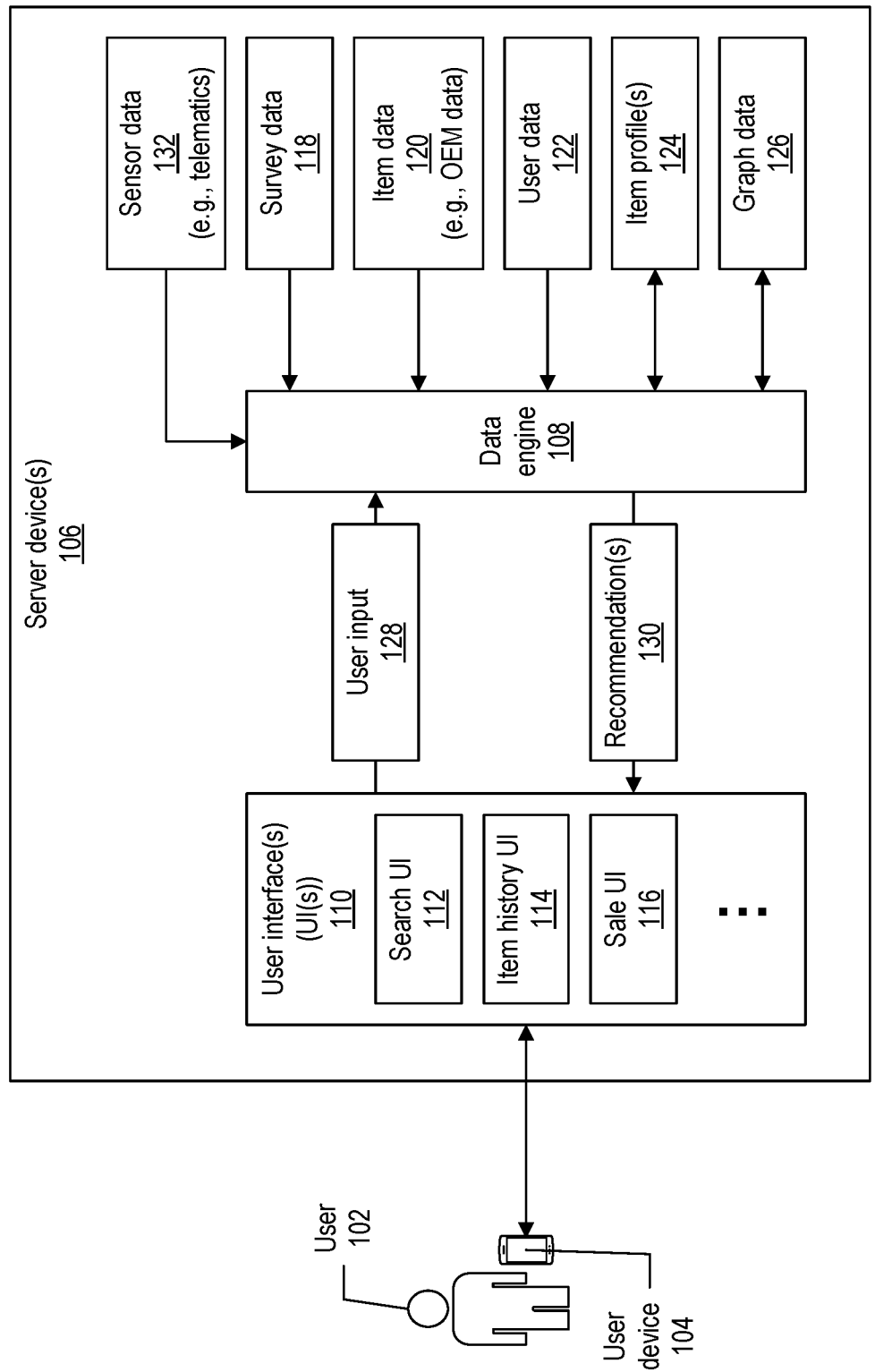
FIG. 1 depicts an example system for analyzing data, determining recommendation(s), and providing other types of information to user(s), according to implementations of the present disclosure.

Implementations of the present disclosure are directed to systems, devices, methods, and computer-readable media for analyzing data regarding users and purchasable items (e.g., products and/or services), and providing user experiences to users regarding the buying, leasing, and/or selling of item(s), the history (e.g., journey) of item(s), and/or other services associated with the item(s) (e.g., insurance, banking, investments, etc.). In some implementations, data may be analyzed by a data engine that provides output to power multiple user experiences (e.g., user interfaces). Such user experiences may include providing a user with recommendation(s) of items (e.g., vehicles) that may be purchased by the user. In some implementations, the data engine receives and analyzes a variety of input data regarding user(s) and purchasable item(s). Based on the analysis, the data engine may provide recommendations regarding items (e.g., products and/or services) that a user may purchase or otherwise acquire. The recommendation(s) may be presented to the user through a search user interface (UI).

In some implementations, the recommendation(s) for a user may be determined through a criteria-based algorithm. The search UI may enable the user to search for items based on various criteria. In some implementations, the criteria may include natural language and/or plain language search terms. In some examples, the natural language and/or plain language terms may exclude technical jargon, brand names, model numbers, model years, and/or numeric specifications of technical attributes (e.g., numbers for horsepower, torque, gas mileage, etc.). For example, the search UI may enable a user to search for an automobile to purchase, and the user may enter criteria (e.g., fun, sporty, economical, beach, hiking, etc.) that describe the automobile, the user's desired experience with the automobile, and/or the user's desired lifestyle generally. The data engine may compare those criteria to item profiles previously generated for one or more automobiles, and determine a set of recommended vehicles that correspond to the criteria entered by the user. Plain language and/or natural language search criteria may express an emotion, a mood, a lifestyle, and/or other aspects that may not be readily quantifiable through the traditional technical specifications employed by traditional search systems.

The data engine may also employ other algorithms to generate recommendations for the user. In some implementations, the data engine may determine a set of content-based recommendations through a machine learning process that classifies a user's affinities (e.g., likes, dislikes, etc.) for item(s) according to automobile specifications provided by manufacturers of the vehicles. In some implementations, the data engine may determine a set of collaborative recommendations by correlating a first user with a second user based on at least a partial correspondence between the affinities of the two users, and identifying those items that were liked (or disliked) by the second user as positive (or negative) recommendations for the first user. In some implementations, the various algorithms may be employed in combination to determine a set of item recommendations for the user. In some examples, the criteria-based algorithm may be employed to initialize (e.g., seed) a set of recommendations for a user, which may then be refined through use of the content-based and/or collaborative algorithm(s).

The data engine may also output information that provides the basis for other user experiences in addition to, or instead of, the search UI. For example, the data engine may provide information presented through an item history UI that describes the history (e.g., journey) of an item such as an automobile, including repair and maintenance history, trips taken, locations visited, distance traveled, fuel consumption, operating conditions, and so forth. In some implementations, the data engine may provide information presented through a sale UI that assists the user in selling an item (e.g., a vehicle) to another user. The data engine may also provide information to support (e.g., power) other UI(s) related to product or service offerings, customer support, and so forth. Accordingly, the data engine may enable a user experience (e.g., a comprehensive user experience) to be provided to a user with regard to various owned or operated items (e.g., vehicles, homes, appliances, etc.) as well as the user's services (e.g., insurance, financial services, etc.). The various UI(s) may provide different lenses and/or views into the data that is collected and analyzed by the data engine. The data engine may provide different insights to users regarding their use and/or ownership of items such as vehicles.

Although examples herein may describe the items as vehicles, implementations are not so limited. In some implementations, the data engine may be employed to analyze data and provide output data for user experiences associated with other types of items, such as homes (e.g., houses, apartments, condominiums, etc.), appliances, computer hardware and/or software products, travel destinations, and so forth.

FIG. 1 depicts an example system for analyzing data, determining recommendation(s), and providing other types of information to user(s), according to implementations of the present disclosure. As shown in the example of FIG. 1, the system may include a user device 104 that is owned by, operated by, and/or otherwise associated with a user 102. The user device 104 may include any appropriate type of computing device, including but not limited to a tablet computer, smartphone, wearable computer, implanted computer, laptop computer, desktop computer, and so forth. The user device 104 may communicate over one or more networks with one or more UIs 110 that are executing on and/or otherwise provided by one or more server devices 106. The server device(s) 106 may include any appropriate type of computing device. Employing the UI(s) 110, the user 102 may specify user input 128. The user input 128 may be accessed by a data engine 108 that executes on the server device(s) 106. The data engine 108 may analyze the user input 128 and/or other data such as one or more of survey data 118, item data 120, user data 122, item profile(s) 124, graph data 126, and/or sensor data 132. The various types of data may be stored (e.g., locally) on the server device(s) 106. The data may also be stored externally to the server device(s) 106, on storage device(s) that are accessible to the server device(s) 106 over one or more networks. The various types of data are described further below.

The survey data 118 may include the results of surveys taken by various users, in which the users associate particular criteria with particular items (e.g., vehicles). For example, a survey may ask a user whether they think a particular make and/or model of vehicle is sporty, practical, expensive, fancy, economical, good for families, good for hiking, good for kayaking, and so forth. Surveys may employ text, images, video, audio, and/or other types of content to determination associations between criteria and items.

The survey data 118 may be employed by the data engine 108 to generate item profile(s) 124 for one or more items. The item profile(s) 124 may include a record (e.g., profile) for each of one or more items (e.g., vehicles). Each profile may include a list of criteria and a score that indicates, for each criterion, a degree of association between the item and the criterion. The item profile(s) 124 may be determined based on the survey data 118. For example, if a large number of surveys indicate that users tend to associate vehicle brand X with the criterion "sporty", the item profile 124 for vehicle brand X may include a high score for the criterion "sporty." The survey data 118 and the item profile(s) 124 may be employed in the criteria-based analysis to determine recommendation(s) 130, as described further with reference to FIGS. 2 and 3.

The item data 120 may be provided by original equipment manufacturers (OEMs) such as the manufacturer of the vehicle, builder of a house, and so forth. The item data 120 may describe the technical specifications of the item, recommended operating conditions and/or parameters, dimensions, components, and so forth. For example, the OEM-provided item data 120 for a vehicle may indicate one or more of engine size, engine type (e.g., piston, rotary, etc.), horsepower, torque, body type (e.g., coupe, sedan, truck, hatchback, etc.), fuel (e.g., gasoline, diesel, electric, hybrid, etc.), wheel size, length, width, height, number of doors, transmission type (e.g., manual, automatic, etc.), number of transmission gears, steering type (e.g., power, manual, etc.), headlamp configuration, suspension, four-wheel or two-wheel drive, color, price, and so forth. Item data 120 may also include total cost of ownership (TCO) information for a vehicle or other items.

The user data 122 may include any appropriate type of information regarding the user 102. For example, the user data 122 may include the user's location, demographic characteristics (e.g., age, gender, etc.), interests, purchase history, web browsing history, professional and/or social affiliations, and/or social network activities (e.g., posts). The user data 122 may also include identification information such as the user's name, login, profile name, user name, and so forth. The user data 122 may indicate items currently owned by, leased by, and/or otherwise associated with the user 102, such as the user's vehicle(s). The user data 122 may further include one or more of the following: user profile information; transactional data (e.g., banking, insurance, investment transactions, etc.); interaction data describing the user's interactions with a web site, mobile app, desktop application, operating system, and/or other software; historical information regarding the previous items (e.g., vehicles) owned, bought, and/or sold by the user; value information regarding the user's current or historical items; aggregation data that aggregates information from multiple sources such as financial accounts, email, travel reward accounts, etc.; life event data, such as the user getting married, divorced, having children, graduating college, starting or leaving a job, etc.; actuarial data regarding the user 102; advice-related content and/or points of view regarding the user 102; financial readiness information (e.g., financial readiness score) or other financial status data; financial plan, budget, or goals; social media data; data describing interactions between users or interactions between the user 102 and the UI(s) 110; data describing interactions between users and customer service personnel and/or systems; sensor data describing the user's locations, movements, and so forth.

The graph data 126 may include a graphical representation of nodes connected by edges, e.g., as a directed graph.

Users 102, items, and criteria may each be presented by a node, and an edge connecting two nodes may represent an association between the two nodes. The graph data 126 may be generated by the data engine 108 as a representation of the user data 122, the user input 128, the item data 120, the survey data 118, and/or the item profile(s) 124. The graph data 126 may be employed by a content-based algorithm, as described with reference to FIGS. 4 and 5. The graph data 126 may also be employed by a collaborative algorithm, as described with reference to FIGS. 6 and 7.

The data engine 108 may also employ other information to perform the various operations described herein. In some examples, the data engine 108 may access third party data describing the usage of vehicles or other items. Such data may include vehicle value information, depreciation information, TCO data, and so forth. The data engine 108 may also access third party data describing users 102, such as social network data.

Based on the analysis of the user input 128 and/or other data, the data engine 108 may generate output data to be presented through the UI(s) 110 to the user 102. In some implementations, the output data may include one or more recommendations 130 for item(s) that may be purchased or otherwise acquired by the user 102. The recommendation(s) 130 may be determined particularly for the user 102, based on the user input 128 from the user 102 and/or other data. The user 102 may interact with the UI(s) 110 to provide further information, and the recommendation(s) 130 (and/or other output) may be modified based on the further information.

The drive engine 108 may be employed to analyze the various types of data and determine output that is presented to the user 102 through various UI(s) 110 provided by the server device(s) 106. Accordingly, the data engine 108 may be described as the underlying technology and/or core that drives or otherwise enables the various user experiences provided through the various UI(s) 110. The UI(s) 110 may include a search UI 112, which enables a user 102 to search for items to purchase (e.g., vehicles, homes, etc.) based on criteria provided by the user 102 and/or other information. This search functionality is described further with reference to FIGS. 2-9.

Implementations support the use of various recommendation determination algorithms to generate recommendation(s) 130 to be presented to a user 102 through the search UI 112. Such algorithms may include one or more of: a criteria-based algorithm, described with reference to FIGS. 2 and 3; a content-based algorithm, described with reference to FIGS. 4 and 5; or a collaborative algorithm, described with reference to FIGS. 6 and 7. In some implementations, the individual sets of recommendation(s) 130 generated by the various algorithms may be combined and/or merged to determine an overall set of recommendation(s) 130, as described with reference to FIGS. 8 and 9.

The UI(s) 110 may also include other UI(s) that provide various user experience(s). For example, the UI(s) 110 may include an item history UI 114 that describes the history (e.g., journey) of a vehicle or other item. Such history may describe various aspects of the user's experience with the item, including repair and maintenance history, trips taken, locations visited, distance traveled, fuel consumption, operating conditions, and so forth. In some implementations, the information presented in the item history UI 114 may be based at least partly on sensor data 132 collected from the item. For example, sensors of an in-vehicle telematics device may collect sensor data 132 describing the operations of a vehicle, such as fuel consumption, distance traveled, locations at various times, velocity, acceleration, temperature, and so forth. The item history UI 114 may also present information regarding repairs and/or maintenance of the vehicle, such as visits to a garage or body shop, the replacement of parts, tune-ups, fluid changes, and so forth. Such information may be generated by sensors and/or telematics device(s) in the vehicle. Information may also be provided by insurance services, financial services, and so forth. In some instances, the information may be provided by the user 102 as user input 128 to the item history UI 114 and/or may be collected from third parties such as garages, mechanics, repair shops, and so forth. The item history UI 114 may also present information that includes item data 120, such as OEM data.

In some implementations, the item history UI 114 may provide recommendations to the user 102 regarding preventative maintenance and/or other types of maintenance. In some examples, the data engine 108 may model the sensor data 132, item data 120, and/or other information to make predictions regarding potential problems that the vehicle may exhibit in the future. For example, the data engine 108 may analyze item data 120 regarding the user's vehicle, maintenance history of other similar (e.g., same make, model, year, etc.) vehicles, the user's driving habits (e.g., rough vs. smooth terrain), driving locations, and/or other data to predict a probability that a particular component of the vehicle (e.g., drive shaft) may fail within a certain time period. The data engine 108 may generate a recommendation, presented through the item history UI 114, that the user 102 engage a mechanic to examine the component prior to its possible failure.

The item history UI 114 may also assist the user 102 in managing the transition from owning and operating a vehicle to selling the vehicle. For example, the data engine 108 may analyze information indicating the depreciation and/or TCO of the vehicle and determine when it may be cost effective for the user 102 to sell the vehicle and purchase another. The item history UI 114 may direct the user 102 to the sale UI 116 to begin the sale process. The item history UI 114 may be described as providing a diary of the user's experience with a particular vehicle or other item, from a time of purchase (or other acquisition) to a time of sale.

In some implementations, the UI(s) 110 may include a sale UI 116 that assists the user 102 in selling an item (e.g., a vehicle) to another user. From the buyer's perspective, the sale UI 116 may provide functionality that is similar to that of the search UI 112, enabling a buyer to view recommendations that are determined based on user-entered criteria and other information as described below. The sale UI 116 may also include other functionality to assist a user 102 who is a seller. For example, the sale UI 116 may help match a buyer with a seller based on a correspondence between one or more criteria specified by the buyer and seller (e.g., they both like "fun"). The criteria may indicate an emotional effect of a vehicle and/or the users' impression of the vehicle, such as that the vehicle is fun, sporty, practical, good for hauling, suitable for towing, useful for families, and so forth.

The UI(s) 110 may also include other UI(s) related to product or service offerings, customer support, and so forth. In some implementations, the UI(s) 110 may enable a user 102 to browse and/or purchase particular services related to item ownership. For example, the UI(s) 110 may include a pay-per-distance (e.g., pay-per-mile) UI to enable the user 102 to enroll in an insurance plan that charges based on the distance traveled and/or the amount of time spent in a vehicle. The information presented through such a UI may be based on sensor data 132 (e.g., telematics data), user data 122, and so forth. The UI(s) 110 may also provide other services, such as enabling the user 102 to lease and/or rent an item (e.g., vehicle, home, etc.).

In some implementations, the UI(s) 110 are presented as a web application that is viewable in a browser executing on the user device 104. In some implementations, the UI(s) 110 may be presented in another type of application (e.g., a native application) executing on the user device 104. The UI(s) 110 may include graphical user interfaces (GUIs), command-line user interfaces, or any other suitable type of interface. The UI(s) 110 may present information visually. The UI(s) 110 may also present information as audio output (e.g., sounds, speech, etc.), haptic output (e.g., vibrations or other movements of the user device 104), or otherwise.

In some implementations, the criteria that are selectable by the user 102 may be associated with general aspects of the user's lifestyle, such as the user's interests in the outdoors, sports, business, raising children, and so for. The criteria may also indicate how the user 102 plans to use the vehicle, to any suitable degree of specificity. For example, the user 102 may select criteria indicating an intended use of the vehicle for commuting, camping, transporting children, towing, using a car for work (e.g., participating in a ride-sharing service), and so forth.

Some implementations employ a classifier, which may also be described as a model, to determine recommendations to provide to a user 102. The classifier may be trained, refined, and/or otherwise developed using a learning algorithm that executes as part of the data engine or separately from the data engine. Determination and use of the classifier is described further below. In some implementations, the learning algorithm may refine the classifier based on information describing actual outcomes of the search process. For example, the data engine may determine recommendations for the user, and information may be collected regarding which vehicle the user decides to purchase. The learning algorithm may compare the recommendations to the actual purchase, and refine the classifier, based on the comparison, to provide more accurate recommendations in the future to the same user and/or other users.

In some implementations, the classifier may provide a model that is developed based on behavioral data, demographic data, and/or psychometric data for users. Behavioral data includes a description of particular behaviors of the user and/or other users who behave similarly to the user. Behavior can include particular activities that user(s) perform using their vehicles, such as work-related activities, recreational activities, family-related activities, and so forth. Demographic data includes a description of the users themselves, such as their location, age, gender, profession, educational achievement, marital status, parental status, and so forth. Psychometric data includes a description of how users answer particular questions posed to them as part of the vehicle search process (e.g., through the UI(s) 110). Users who exhibit similarity in how they answer such questions may be determined to be psychometrically similar. The classifier (or model) described herein may be based on one or more of behavioral data, demographic data, and/or psychometric data.

In some implementations, other types of models may be employed in conjunction with the classifier to determine vehicle recommendations for a user 102. For example, an income-based model may be developed for a user 102 based on known (or inferred) information regarding the user's income, debts, assets, and so forth. The income-based model may include a budget that is suitable for a particular user 102, such as an overall budget for a vehicle purchase and/or monthly budget covering the cost of owning and/or operating the vehicle. In instances where financial information may not be available for a particular user, an income-based model may be developed for that user based on identified similarities between the user and another user for whom financial information is available. In some implementations, a model may be determined for a user that predicts whether the user is likely to prefer a new vehicle or a used vehicle, and/or whether the user is likely to prefer a vehicle purchase or a vehicle lease.

Figure 2:
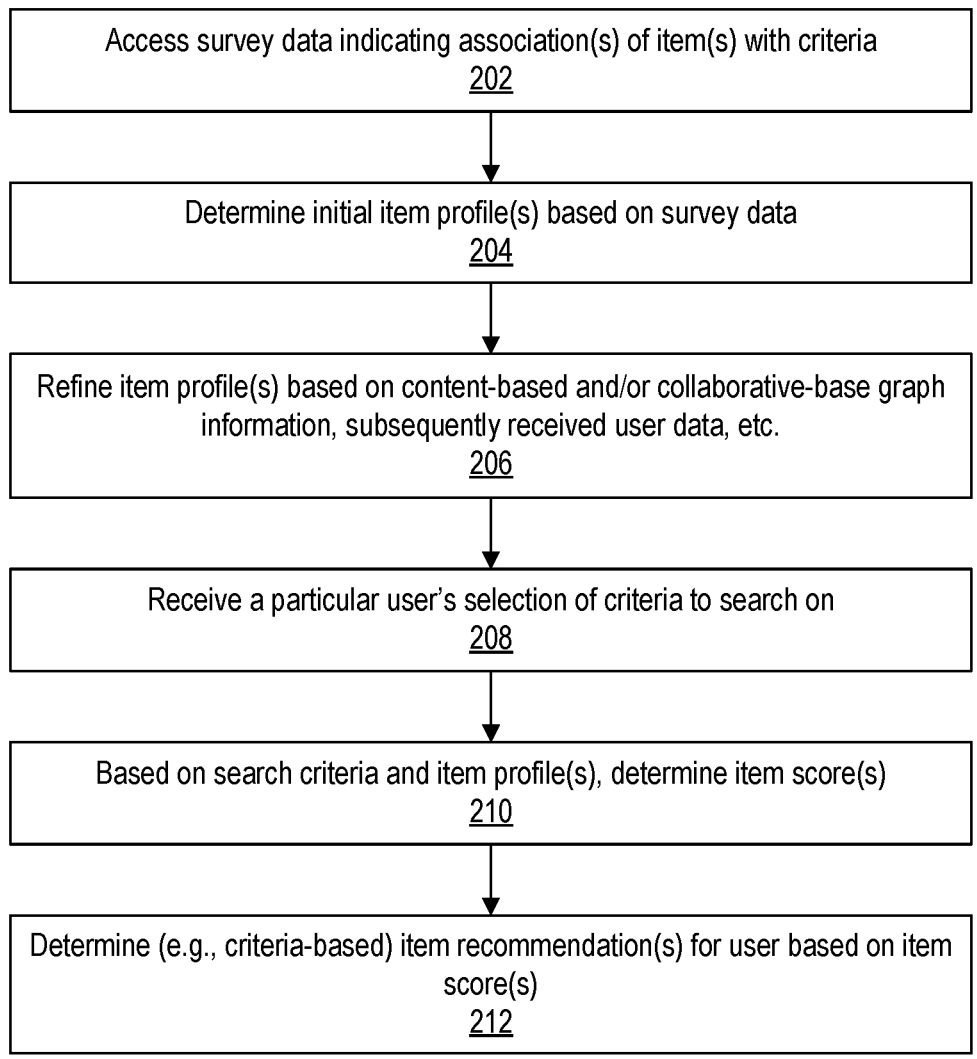
FIG. 2 depicts a flow diagram of an example process for determining item recommendations for a user, according to implementations of the present disclosure.

FIG. 2 depicts a flow diagram of an example process for determining (e.g., criteria-based) item recommendations 130 for a user 102, according to implementations of the present disclosure. Operations of the process may be performed by one or more of the data engine 108, the UI(s) 110, or other software module(s) executing on the server device (s) 106, the user device 104, or elsewhere.

The survey data 118 may be accessed (202). As described above, the survey data 118 may indicate, for one or more items, an association of the item with one or more criteria. The association may be a positive association, e.g., item A is criterion X. The association may be a negative association, e.g., item B is not criterion Y. The association may also indicate a degree of association between an item and a criterion, e.g., item C is 75% criterion Z.

An initial set of item profile(s) 124 may be determined (204) based on the survey data 118. FIG. 3 depicts an example of item profiles 124. As shown in this example, an item profile 124 may include the name of an item (e.g., "AB12"). The item profile 124 may also include a list of criteria 302 and a criterion score 304 associated with each of the criteria 302. In some examples, a positive score may indicate a degree of positive association of an item with a criterion, e.g., an item is a criterion. A negative score may indicate a degree of negative association of an item with a criterion, e.g., an item is not a criterion. The "\" characters in the example item profiles 124 of FIG. 3 indicate a line continuation, e.g., the record of criterion/score pairs for an item continues to a next line.

In some instances, a criteria score 304 for a criterion 302 of an item may be an average of the scores assigned by multiple users in multiple surveys. For example, a survey may ask 10000 users whether the item "AB12" is sporty. If 7524 of the users indicate that they think "AB12" is sporty, the item profile 124 for "AB12" may include a criterion score 304 of 0.7524 for the "sporty" criterion 302. In instances when the survey asks users to rank whether "AB12" is sporty on a scale, e.g., from −10 (maximally non-sporty) to 10 (maximally sporty), the criterion score 304 may be an average of the various numeric rankings in the survey results for "AB12" and "sporty."

Implementations support the use of any appropriate number of criteria 302, and any appropriate criteria 302, for an item profile 124. For example, in instances where the item(s) are vehicles (e.g., cars, trucks, motorcycles, recreational vehicles, mopeds, boats, aircraft, etc.), the criteria 302 may include, but are not limited to: comfort, holds value, affordable, quality, reputation, reliable, safe, fuel efficient, spacious, urban, commuting, towing, carpooling, practical, sporty, family friendly, unique, luxury, and so forth. Although examples herein may describe the various criteria 302 as adjectives (e.g., unique) or descriptive words and/or phrases (e.g., family friendly), implementations are not so limited. In some implementations, users may be asked in a survey to indicate a song, book, movie, genre, and/or idea that describes an item, and the criteria 302 may include the various songs, books, movies, genre, and/or ideas that were indicated by users in the survey results. In this way, implementations may provide an emotional profile and/or personality profile of an item such as a vehicle. For example, one vehicle may be characterized as "rock and roll" whereas another vehicle may be characterized as "jazz" or "avant garde." As another example, one vehicle may be characterized as a "western film" whereas another may be characterized as "science fiction film."

Returning to FIG. 2, in some implementations the initial item profile(s) 124 may be refined (206) over time based on the content-based and/or collaborative analysis described below. The item profile(s) 124 may also be refined based on subsequently received user input 128 from one or more users 102, additional survey data 118, or other information. In this way, the item profile(s) 124 may be refined over time to provide a more accurate description of an item such as a vehicle.

A particular user 102 may provide, through the search UI 112, a selection of various criteria 302 to search on. The user's selected criteria 302 may be received (208). For example, the user 102 may enter search criteria such as "sporty" and "fun" or "practical" and "family friendly" to indicate the type of vehicle the user 102 wants, the type of driving experience the user 102 is seeking, and/or the type of life experience the user 102 is seeking. In this way, implementations enable a user 102 to provide aspirational criteria 302 that describe a lifestyle the user is seeking, in addition to or instead of indicating criteria 302 that describe the user's current situation. In some implementations, the selected criteria may be filtered prior to subsequent processing. Such filtering may be based on one or more rules, and may remove selected criteria that the rules indicate are mutually incompatible. For example, if a user selects criteria that include both "sports car" and "towing," one or both of the criteria may be filtered out, given that there may not be vehicles that are both a sports car and are suitable for towing. In some implementations, the user 102 may be prompted to resolve such a conflict if an incompatibility is determined within a set of selected criteria.

The user's selected criteria 302 and the item profile(s) 124 may be used to determine (210) one or more item scores for the user 102. An item score may indicate a degree of correlation between the user's entered criteria 302 and the item profile 124 of a particular item. In some implementations, the item score for an item may be an average of the individual criteria scores 304 corresponding to the search criteria 302 entered by the user 102. For example, a user 102 may specify the following criteria 302 through the search UI 112: "comfort," "affordable," "safe," and "family friendly." Based on these criteria 302 and the item profile 124(1) shown in FIG. 3, the data engine 108 may determine an item score of −0.2489 for item "AB12". Based on the item profile 124(2), an item score of 0.992 may be determined for item "BC23". Based on the item profile 124(3), an item score of 0.685 may be determined for item "CD34". In this example, each entered search criteria 302 is weighted the same in determine the item score. In some implementations, criteria 302 may be weighted differently such that the determination of the item score may include calculating a weighted average of the criterion scores 304 for the search criteria 302.

The criteria-based recommendations 130 for a user 102 may be determined (212) based on the item scores. In some examples, the recommendations 130 may be provided as a ranked list that is ordered according to the item scores. Following the example above, the recommendation(s) 130 may include (e.g., in ranked order): "BC23" with score 0.992, "CD34" with score 0.685, and "AB12" with score −0.2489. In some implementations, items with a negative score may be omitted from the recommendation(s) 130, given that such items have been determined to be negatively associated with the user's search criteria 302. The recommendation(s) 130 may be transmitted for presentation to the user 102 through the search UI 112.

Figure 4:
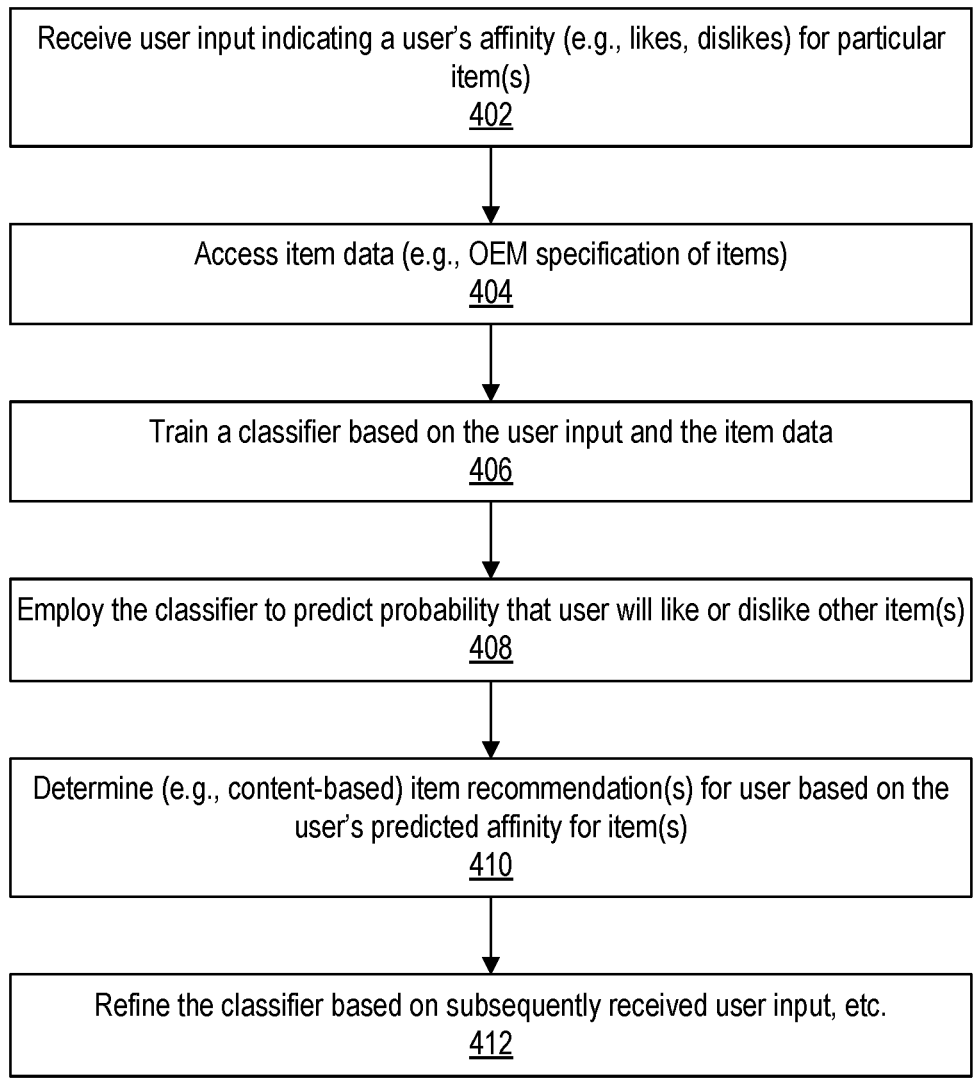
FIG. 4 depicts a flow diagram of an example process for determining item recommendations for a user, according to implementations of the present disclosure.

FIG. 4 depicts a flow diagram of an example process for determining (e.g., content-based) item recommendations 130 for a user 102, according to implementations of the present disclosure. Operations of the process may be performed by one or more of the data engine 108, the UI(s) 110, or other software module(s) executing on the server device(s) 106, the user device 104, or elsewhere.

User input 128 is received (402). As described above, the user input 128 may be provided by the user 102 through one or more of the UI(s) 110, such as the search UI 112. The user input 128 may indicate the user's affinity for particular item(s) such as vehicles. In some implementations, the user 102 may indicate their affinity for an item as a binary like or dislike, e.g., a thumbs up or a thumbs down for a particular item. In some implementations, the user 102 may indicate their affinity in a more granular manner, such as rating an item on a scale from 0 to 10, where 10 indicates that the user 102 has a maximum positive affinity for the item and 0 indicates that the user 102 has a minimum positive affinity (or a maximum negative affinity) for the item. As used here, affinity can indicate any degree to which the user 102 likes and/or dislikes an item.

Item data 120 is accessed (404). As described above, the item data 120 may indicate a set of technical specifications for each of one or more items. In some instances, the item data 120 may be provided by OEM(s) of the item(s).

A classifier may be trained (406) based on training data that includes the item data 120 and the user input 128 that indicates the user's various affinities for items. In some implementations, the classifier may be trained through machine learning. The classifier may identify correlations between the user's likes, or dislikes, and the particular technical specifications of items. For example, the classifier may examine multiple vehicles liked and/or disliked by the user 102 and determine that the user 102 tends to like vehicles that have a manual transmission and dislike vehicles that have an automatic transmission. As another example, the classifier may determine that the user 102 tends to like vehicles with high (e.g., above a threshold) horsepower and dislike vehicles with low (e.g., below a threshold) horsepower. Accordingly, the classifier may include logic that determines for a particular item (e.g., vehicle) a likelihood that a particular user 102 will like or dislike that item. The output of the classifier may be a binary prediction of like or dislike. In some implementations, the output of the classifier is a numeric prediction of affinity on a scale from minimum affinity (e.g., maximum dislike) to maximum affinity (e.g., maximum like). For example, the classifier may output a value between 0 and 1, where 0 indicates zero likelihood that the user 102 will like an item and 1 indicates 100% likelihood that the user 102 will like the item.

The classifier may be employed (408) to predict an affinity of the user 102 for one or more item(s) and/or determine a probability that the user 102 may like, or dislike, one or more items. Based on the predicted affinities, a set of (e.g., content-based) item recommendations 130 may be determined (410) for the user 102. The recommendations 130 may be provided for presentation to the user 102 through the search UI 112. In some implementations, the recommendations 130 may be a list that is ranked and/or ordered based on the predicted likelihood that the user 102 will like the items.

In some implementations, the classifier may be refined (412) or otherwise modified through further training based on subsequently received information. For example, the user 102 may be presented with a set of recommendations 130 determined through one or more of the algorithms described herein, and the user 102 may provide further user input 128 indicating their affinity (e.g., likes and/or dislikes) for the recommended item(s). This additional affinity information may be employed as training data to refine the classifier. The classifier may be refined any number of times over any time period based on additional information received regarding the user's affinities.

In some implementations, the content-based algorithm may examine and cluster multiple users according to similarities in location, purchase history, content browsing history, demographics, and/or other characteristics. Clustering may also be based on similarities between life experiences of the users in the cluster. For example, users may be clustered together if they are going through, or are about to go through, a similar life event such as starting a job, retiring from a job, starting a family, sending children to college, and so forth.

Based on the user's expressed likes and/or dislikes of items, the classifier may be trained to predict whether the user 102 will like or dislike item(s) that the user 102 has not yet seen and expressed an opinion on. Accordingly, the classifier may determine whether an item may be a "good fit" for the user 102 based on its technical specifications. In some implementations, the classifier may traverse a decision tree or other type of graph to determine the likelihood that a user 102 will like, or dislike, an item. In some implementations, the classifier may be trained based on technical specifications of the item(s) as described above. The classifier may also be trained based on other features of the item(s), such as whether the OEM is in a particular country.

Figure 5:
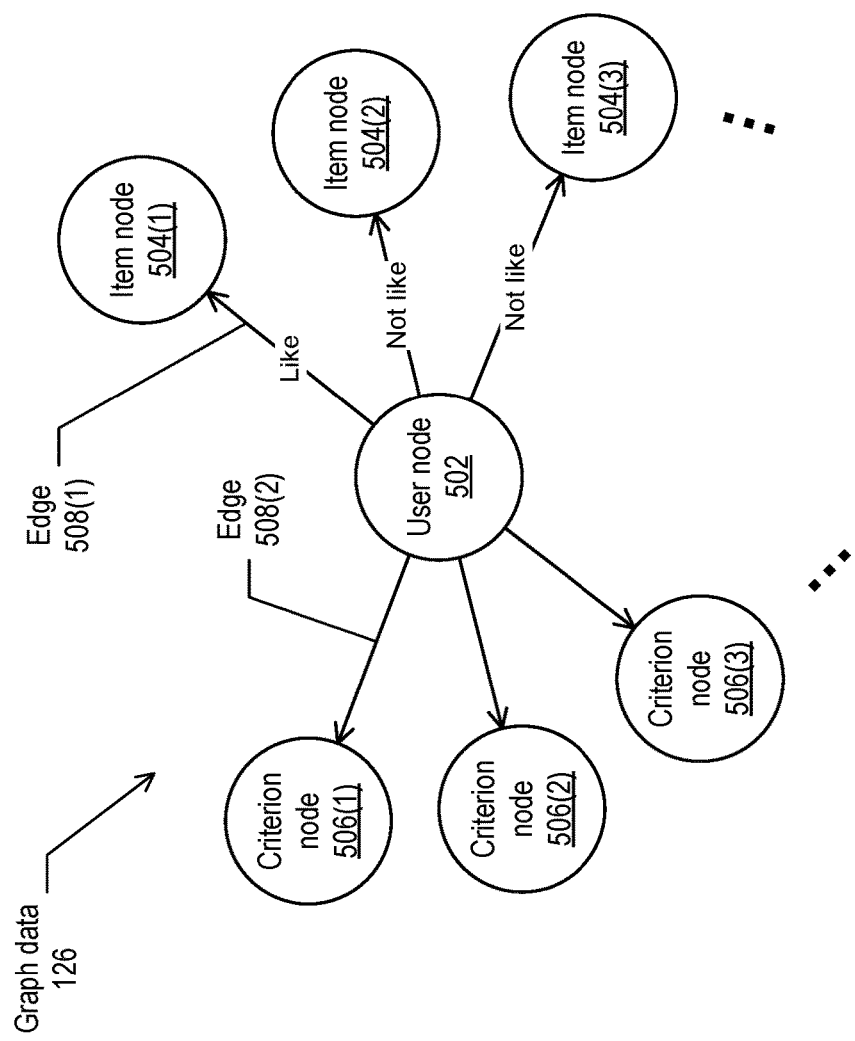
FIG. 5 depicts an example of graph data that may be employed to determine item recommendations for a user, according to implementations of the present disclosure.

FIG. 5 depicts an example of graph data 126 that may be employed to determine (e.g., content-based) item recommendations 130 for a user 102, according to implementations of the present disclosure. In some implementations, the information describing a user's affinities, e.g., likes and/or dislikes, for items may be arranged and analyzed in a graph form, as graph data 126. The analysis of a graph may include traversal of the graph along particular path(s) that are governed by the values of edges 508 in the graph.

In some implementations, the graph data 126 may include a user node 502 corresponding to the user 102. The graph data 126 may include one or more item nodes 504 each corresponding to an item. Edges 508(1) may connect the user node 502 to the various item nodes 504. In some implementations, an edge 508(1) between the user node 502 and a particular item node 504 may include a value that indicates the user's expressed affinity for the item corresponding to the item node 504. For example, if the user 102 has liked or disliked an item through the search UI 112, the edge 508(1) may include a value of "like" or "not like" respectively. In some implementations, the value of an edge 508(1) may indicate a predicted affinity of the user 102 for the corresponding item, where the predicted affinity is determined by the classifier as described with reference to FIG. 4.

In some implementations, the graph data 126 may include one or more criterion nodes 506 each corresponding to a criterion 302. If the user 102 has expressed an affinity for a criterion 302, the criterion node 506 corresponding to the criterion 302 may be connected to the user node 502 by an edge 508(2). The presence of the edge 508(2) connecting the user node 502 to the criterion node 506 may indicate that the user 102 has expressed an affinity for the criterion 302. For example, the user 102 may have entered the criterion 302 as a search criterion in the search UI 112, as described with reference to FIG. 2. In some implementations, a criterion node 506 may be connected to one or more item nodes 504 if the corresponding items have been associated with the criterion 302. For example, a criterion node 506 may be connected by an edge 508 to an item node 504, and the value of the edge 508 may be the criterion score 304 indicating the strength of association between the item and the criterion 302, e.g., determined through survey data 118 or otherwise.

Determine of the content-based recommendation(s) 130 may include traversing the graph according to the values of the various edges 508 connecting various nodes. For example, the data engine 108 may traverse the graph by following those edges 508 that have values indicating a predicted affinity of the user 102 for the item. The item(s) corresponding to the connected item node(s) 504 may be added to the determined set of recommendations 130. The data engine 108 may also traverse the graph along edges 508(2) connecting the user node 502 to criterion nodes 506 and then along edges connecting the criterion nodes 506 to item nodes 504. The item(s) corresponding to the connected item node(s) 504 may also be added to the determined set of recommendations 130.

Figure 6:
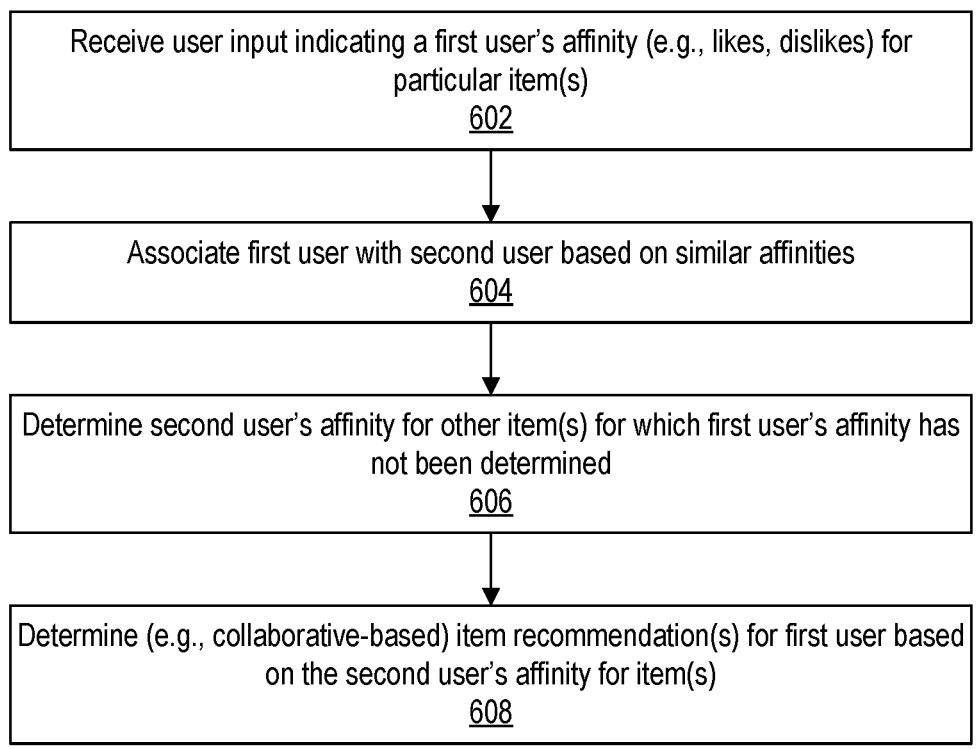
FIG. 6 depicts a flow diagram of an example process for determining item recommendations for a user, according to implementations of the present disclosure.

FIG. 6 depicts a flow diagram of an example process for determining (e.g., collaborative) item recommendations 130 for a user 102, according to implementations of the present disclosure. Operations of the process may be performed by one or more of the data engine 108, the UI(s) 110, or other software module(s) executing on the server device(s) 106, the user device 104, or elsewhere.

User input 128 may be received (602) indicating the affinity of a first user 102 for one or more particular items, as described above. The first user 102 may be associated (604) with a second user 102 based at least partly on the second user 102 having expressed similar affinities as the first user 102. For example, the first and second users 102 may have both liked, or disliked, one or more particular items. The association may also be based on other similarities, such as similarities in location, purchase history, travel history, web browsing history, demographic characteristics, shared interests indicated on social networks or other public forums, and so forth.

The process may determine (606) the second user's affinity for other item(s) for which the first user's affinity has not been determined. For example, the second user 102 may have liked or disliked a set of items that the first user 102 is not aware of and has not expressed an affinity for. As another example, the classifier used in the content-based algorithm may predict that the second user 102 is likely to have a positive affinity for a set of items that the first user 102 is not aware of A set of (e.g., collaborative) recommendations 130 may be determined (608) for the first user 102 based on the other item(s) that have an affinity association with the second user 102. The recommendations 130 may be provided for presentation to the first user 102 through the search UI 112. In some implementations, the recommendations 130 may be a list that is ranked and/or ordered based on the predicted likelihood that the first user 102 will like the items. In some examples, the predicted likelihood that the first user 102 will like an item may be based on the strength of the association between the first and second users 102. The strength of that association may be based at least partly on the degree of similarity between the users' expressed affinities, the users' characteristics, and/or other considerations.

Figure 7:
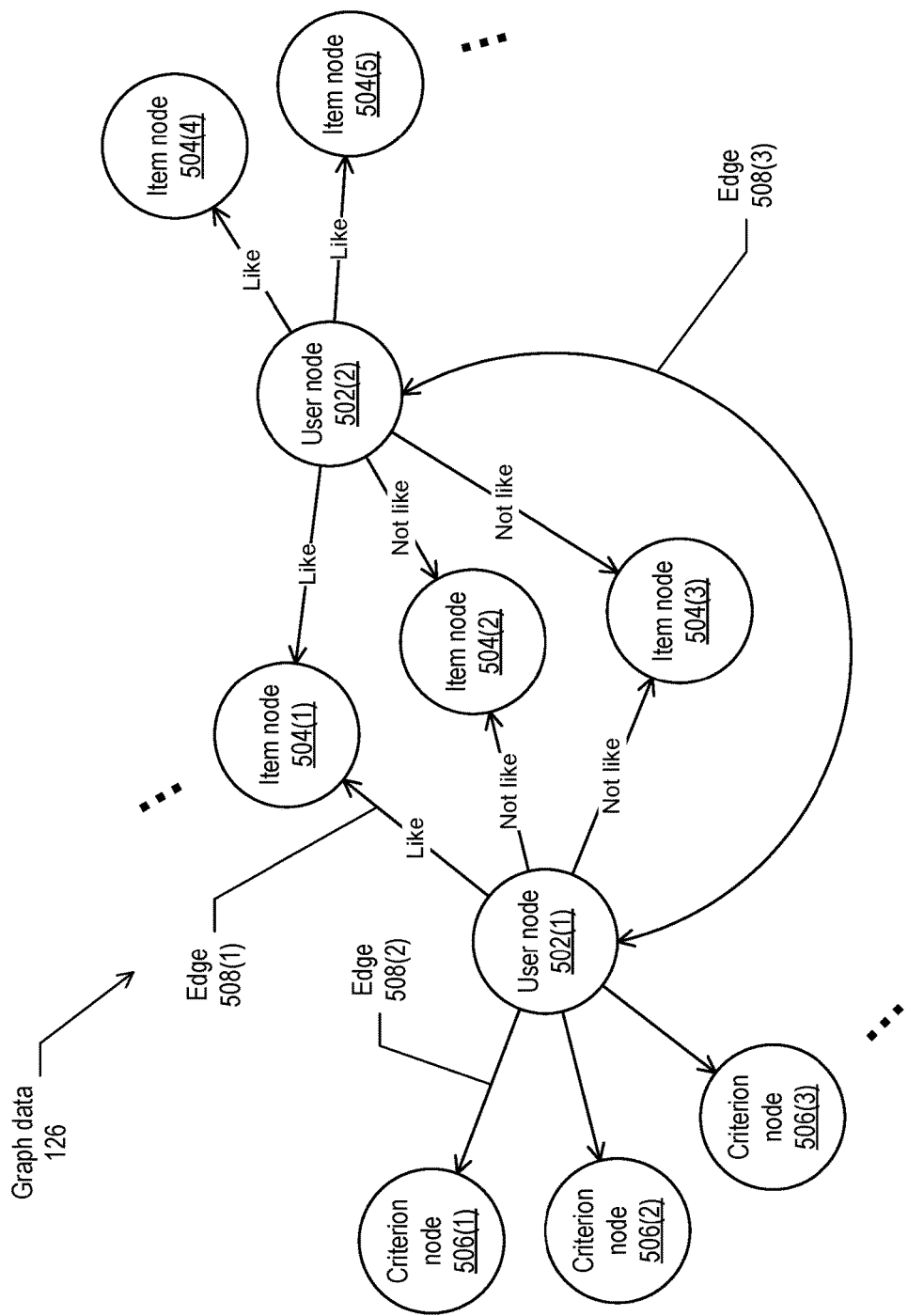
FIG. 7 depicts an example of graph data that may be employed to determine item recommendations for a user, according to implementations of the present disclosure.

FIG. 7 depicts an example of graph data 126 that may be employed to determine (e.g., collaborative) item recommendations 130 for a user 102, according to implementations of the present disclosure. As shown in the example of FIG. 7, a first user 102 and a second user 102 may correspond respectively to a user node 502(1) and a user node 502(2). Based on similarities in affinity for items, and/or based on other similarities as described above, the user nodes 502 may be connected by an edge 508(3) that indicates the similarity-based association of the users 102. In the example of FIG. 7, the association between the user nodes 502(1) and 502(2) is based at least partly on the similarity of affinities between those user nodes 502 and the item nodes 504(1)-504(3). To determination recommendation(s) 130 for the first user 102, the graph may be traversed to identify those item nodes 504(4), 504(5), and so forth for which the connecting edge 508 indicates a positive affinity between the second user 102 and the corresponding items. Those items may then be added to a set of recommendation(s) 130 to be presented to the first user 102.

The information describing the various nodes and edges in the graph data 126 may be stored in a database on the server device(s) 106 or elsewhere. The graph data 126 may include nodes for users 102, items, and/or criteria. The graph data 126 may also include any number of edges, where an edge indicates a connection between a pair of nodes. The edge may have a value that indicates a strength of association and/or a degree of affinity between two nodes as described above. The graph data 126 may be modified as additional information is received regarding users 102, items, and/or criteria. For example, as a user 102 likes and/or dislikes items presented in the UI(s) 110, the graph data 126 may be modified to include additional edges and/or nodes indicating the user's expressed affinities for the items. As a user 102 enters search criteria through the search UI 112, the graph data 126 may be modified to include additional edges and/or nodes indicating the user's expressed affinities for the search criteria.

A user's affinity for items and/or criteria may be determined based on the user's various inputs to the UI(s) 110, such as entered search criteria and/or indicated likes or dislikes of items as described above. The user's affinity for items and/or criteria may also be determined based on other information, including but not limited to one or more of the following: the user's browsing behavior online, the user's purchase history, the user's history test driving vehicles, information collected from social network posts or other published information, and so forth. In some examples, the strength of an affinity between the user 102 and an item or criterion (e.g., indicating by an edge value) may be determined based at least partly on the source data that led to the determination of the affinity. For example, if a user 102 test drives or buys a particular vehicle, an affinity may be determined between the user 102 and that vehicle. That affinity may be stronger (e.g., given a higher edge value) than an affinity determined based on the user 102 having browsed a web page that describes the vehicle or based on the user 102 having posted blog comment mentioning the vehicle. The context of the information may also be taken into account in determining the user's affinity for an item and/or criterion. For example, if the user 102 posts to a social network stating that they "hate vehicle X," a negative affinity between the user 102 and the vehicle may be determined. Whereas, if the user 102 posts to a social network stating that they "love vehicle X," a positive affinity may be determined. Moreover, the user's use of words like "hate" or "love" may lead to a determination of a strong negative or positive affinity, whereas words like "don't like" or "like" may lead to a determination of a weaker negative or positive affinity.

A user's affinity for items and/or criteria may be further determined based on the user's various inputs to the UI(s) 110 other than the search UI 112, such as the item history UI 114, the sale UI 116, and so forth. In general, any information provided by the user 102 through any of the user experiences powered by the data engine 108 may be employed in further refining the classifier, the graph data 126, and/or other modeling tools used to determine connections between users, items, and/or criteria. In some implementations, the graph data 126 may be stored in a database or other type of data storage that is indexed to facilitate search and/or other operations.

Figure 8:
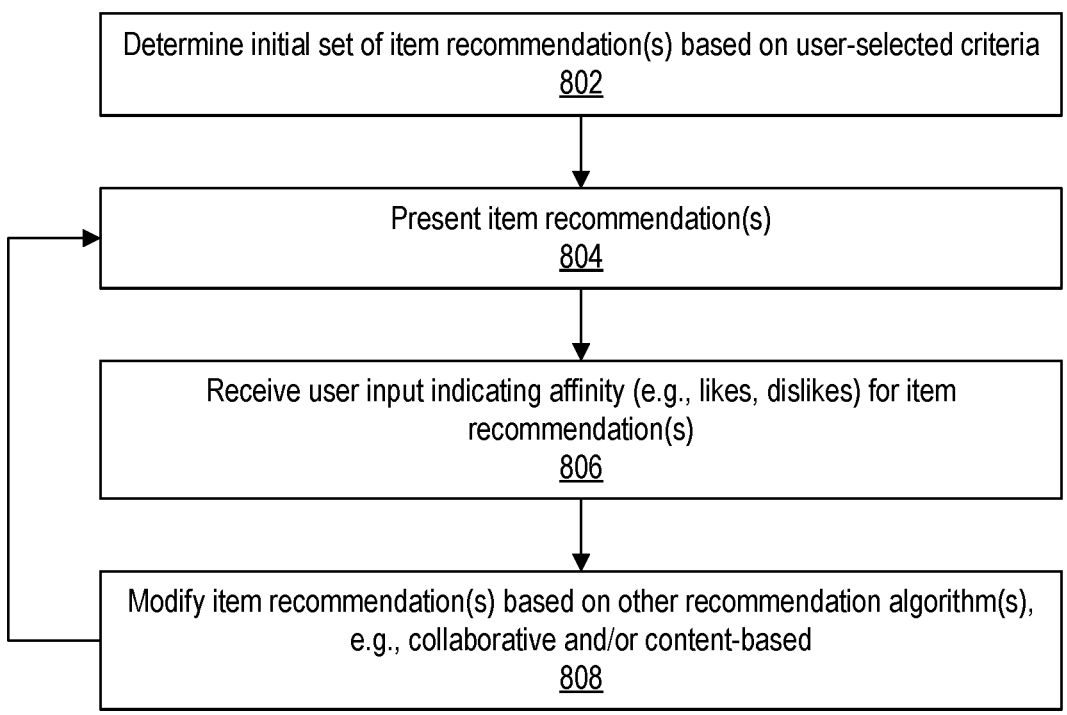
FIG. 8 depicts a flow diagram of an example process for determining item recommendations for a user, according to implementations of the present disclosure.

FIG. 8 depicts a flow diagram of an example process for determining item recommendations 130 for a user 102, according to implementations of the present disclosure. Operations of the process may be performed by one or more of the data engine 108, the UI(s) 110, or other software module(s) executing on the server device(s) 106, the user device 104, or elsewhere.

In some implementations, two or more of the criteria-based, content-based, and collaborative recommendation determination algorithms may be used in conjunction to determine recommendations 130 for a user 102. For example, an initial set of item recommendations 130 may be determined (802) based on the user-selected criteria and the item profiles 124, as described with reference to FIGS. 2 and 3. The initial set of item recommendations 130 may be provided for presentation (804) to the user 102.

The user 102 may employ the search UI 112 to provide user input 128 indicating their affinity (e.g., likes or dislikes) for the various items in the initial set of recommendations 130, and that user input 128 may be received (806). Based on the user input 128, the item recommendations 130 may be modified (808) through operations of the content-based and/or collaborative algorithms as described with reference to FIGS. 4-7. The modified recommendations 130 may be provided for presentation (804) to the user 102, who may then provide further user input 128. In this way, implementations may provide any number of iterations of refining recommendations 130 based on user input 128, using the various recommendation algorithms described herein. In some examples, the criteria-based algorithm may be described as seeding the recommendations 130 with an initial analysis, which is then refined through use of the content-based and/or collaborative algorithms over any number of iterations.

The data engine 108 may be a learning engine which, over time, develops a better and/or more nuanced understanding of relationships between users, items, and/or criteria. For example, the data engine 108 may determine that a particular brand of vehicle is not suitable for towing. In such instances, the data engine 108 may decide not to include that brand of vehicle in its determined recommendations 130 if the user 102 has indicated an affinity for the "towing" criterion.

Figure 9:
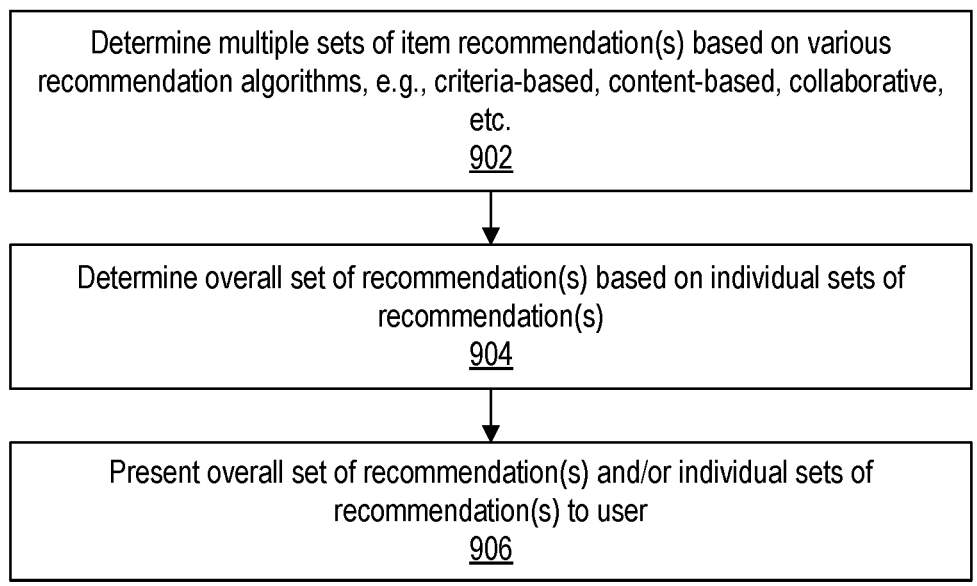
FIG. 9 depicts a flow diagram of an example process for determining item recommendations for a user, according to implementations of the present disclosure.

FIG. 9 depicts a flow diagram of an example process for determining item recommendations 130 for a user 102, according to implementations of the present disclosure. Operations of the process may be performed by one or more of the data engine 108, the UI(s) 110, or other software module(s) executing on the server device(s) 106, the user device 104, or elsewhere.

Multiple sets of recommendations 130 may be determined (902) based on the various recommendation determination algorithms, such as two or more of the criteria-based, content-based, or collaborative algorithms described herein. An overall set of recommendations 130 is determined (904) based on the individual sets of recommendations 130. The overall set of recommendations 130 may be provided for presentation (906) to the user 102 through the UI(s) 110. In some implementations, each of the individual sets of recommendations 130 may be presented, e.g., side-by-side, to the user 102 in addition to, or instead of, the overall set of recommendations 130. In some implementations, the overall set of recommendations 130 may be presented without presenting the individual sets of recommendations 130.

In the example of FIG. 9, the individual sets of recommendations 130 determined through different algorithms are combined to determine an overall set of recommendations 130 for the user 102. Implementations support various techniques for combining the individual sets of recommendations 130. For example, the individual sets of recommendations 130 may be merged to determine the overall set of recommendations, with duplicate items collapsed into a single item in the overall list. In some implementations, the order of the overall list may be based on an average of the rank orders of the items in the individual lists. For example, if an item is ranked second, fourth, and sixth respectively in the three individual lists, it may be listed fourth in the overall list. In some implementations, the different individual lists may be weighted differently in determining the overall list. For example, the rank of an item in the content-based recommendations 130 may weight more heavily than its rank in the collaborative recommendations 130.

In some implementations, the data engine 108 may perform one or more filtering operations to the determined recommendations 130 prior to providing the recommendations 130 for presentation to a user 102. For example, the data engine 108 may access user data 122 describing the financial state (e.g., financial readiness) of the user 102, and filter out those items which may not be affordable to the user 102. Alternatively, the UI(s) 110 may present the recommendations 130 with an indication of which recommended item(s) fit with the user's financial situation, budget, financial plan, long-term goals, or other user data. In some implementations, the TCO of an item (e.g., vehicle) may be taken into account when filtering items. Other considerations may also be taken into account for filtering, such as safety considerations for vehicles. In some implementations, the filtering may be enabled and/or disabled by a user 102 through preferences that are set using the UI(s) 110.

Figure 10:
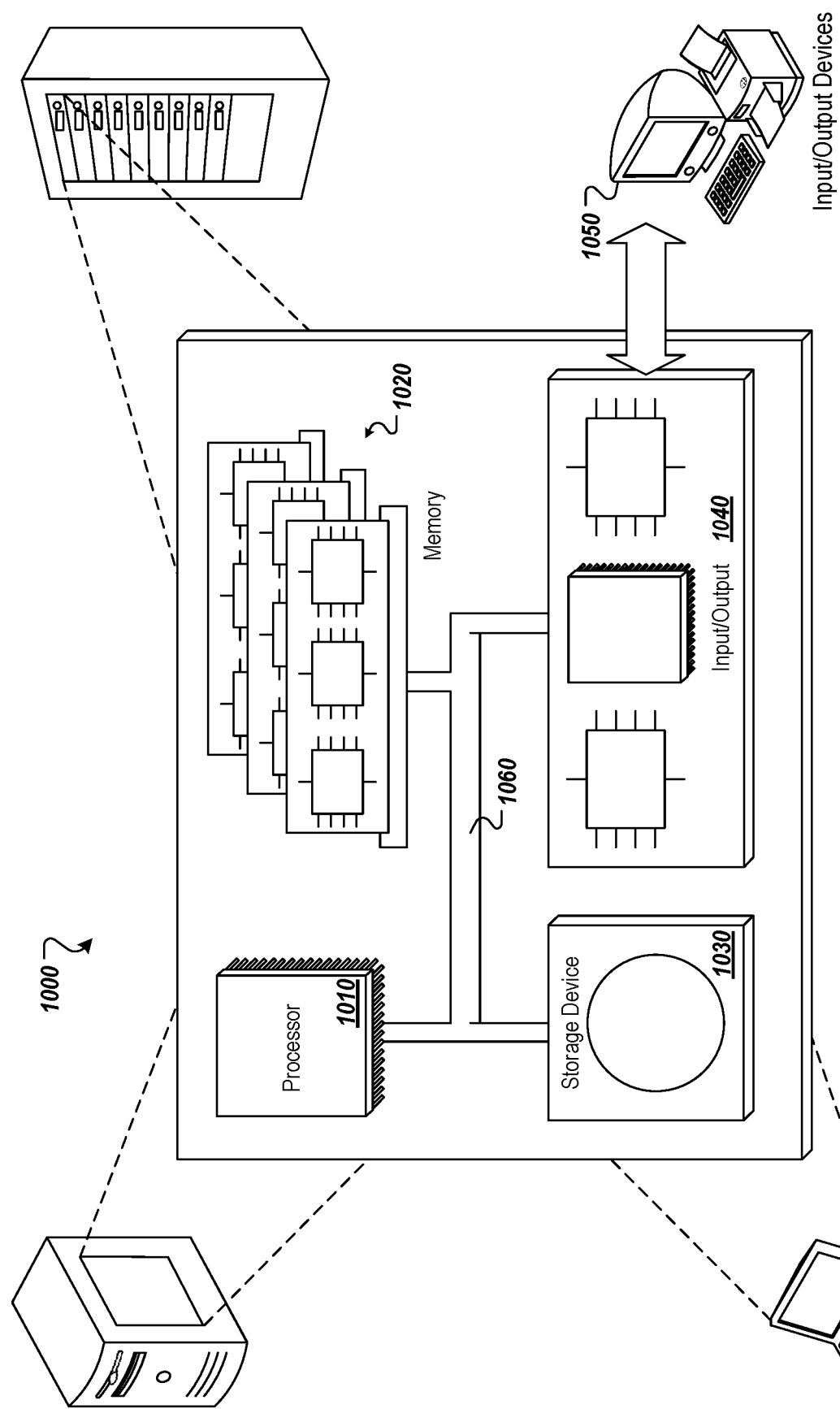
FIG. 10 depicts an example computing system, according to implementations of the present disclosure.

FIG. 10 depicts an example computing system, according to implementations of the present disclosure. The system 1000 may be used for any of the operations described with respect to the various implementations discussed herein. For example, the system 1000 may be included, at least in part, in one or more of the user device 104, the server device(s) 106, or other device(s) described herein. The system 1000 may include one or more processors 1010, a memory 1020, one or more storage devices 1030, and one or more input/output (I/O) devices 1050 controllable through one or more I/O interfaces 1040. The various components 1010, 1020, 1030, 1040, or 1050 may be interconnected through at least one system bus 1060, which may enable the transfer of data between the various modules and components of the system 1000.

The processor(s) 1010 may be configured to process instructions for execution within the system 1000. The processor(s) 1010 may include single-threaded processor(s), multi-threaded processor(s), or both. The processor(s) 1010 may be configured to process instructions stored in the memory 1020 or on the storage device(s) 1030. The processor(s) 1010 may include hardware-based processor(s) each including one or more cores. The processor(s) 1010 may include general purpose processor(s), special purpose processor(s), or both.

The memory 1020 may store information within the system 1000. In some implementations, the memory 1020 includes one or more computer-readable media. The memory 1020 may include any number of volatile memory units, any number of non-volatile memory units, or both volatile and non-volatile memory units. The memory 1020 may include read-only memory, random access memory, or both. In some examples, the memory 1020 may be employed as active or physical memory by one or more executing software modules.

The storage device(s) 1030 may be configured to provide (e.g., persistent) mass storage for the system 1000. In some implementations, the storage device(s) 1030 may include one or more computer-readable media. For example, the storage device(s) 1030 may include a floppy disk device, a hard disk device, an optical disk device, or a tape device. The storage device(s) 1030 may include read-only memory, random access memory, or both. The storage device(s) 1030 may include one or more of an internal hard drive, an external hard drive, or a removable drive.

One or both of the memory 1020 or the storage device(s) 1030 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1000. In some implementations, the CRSM may include a data store that provides storage of computer-readable instructions or other information in a non-transitory format. The CRSM may be incorporated into the system 1000 or may be external with respect to the system 1000. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1010 and the memory 1020 may be supplemented by, or incorporated into, one or more application-specific integrated circuits (ASICs).

The system 1000 may include one or more I/O devices 1050. The I/O device(s) 1050 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1050 may also include one or more output devices such as a display, LED(s), an audio output device (e.g., a speaker), a printer, a haptic output device, and so forth. The I/O device(s) 1050 may be physically incorporated in one or more computing devices of the system 1000, or may be external with respect to one or more computing devices of the system 1000.

The system 1000 may include one or more I/O interfaces 1040 to enable components or modules of the system 1000 to control, interface with, or otherwise communicate with the I/O device(s) 1050. The I/O interface(s) 1040 may enable information to be transferred in or out of the system 1000, or between components of the system 1000, through serial communication, parallel communication, or other types of communication. For example, the I/O interface(s) 1040 may comply with a version of the RS-232 standard for serial ports, or with a version of the IEEE 1284 standard for parallel ports. As another example, the I/O interface(s) 1040 may be configured to provide a connection over Universal Serial Bus (USB) or Ethernet. In some examples, the I/O interface(s) 1040 may be configured to provide a serial connection that is compliant with a version of the IEEE 1394 standard.

The I/O interface(s) 1040 may also include one or more network interfaces that enable communications between computing devices in the system 1000, or between the system 1000 and other network-connected computing systems. The network interface(s) may include one or more network interface controllers (NICs) or other types of transceiver devices configured to send and receive communications over one or more networks using any network protocol.

Computing devices of the system 1000 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1000 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
  receiving, by the at least one processor, one or more search criteria specified by a user through a user interface (UI) executing on a user device, at least one of the search criteria expressing an emotion, mood, or lifestyle;
  determining, by the at least one processor, an item score for each of a plurality of items, the item score for a respective item being associated with the user and determined based on a correspondence between the one or more search criteria and a plurality of criteria scores for the respective item, wherein the plurality of criteria scores is accessed from an item profile that describes, for the respective item, the plurality of criteria scores for a plurality of criteria, and wherein the plurality of criteria scores include at least one score for an emotional or lifestyle aspect of the item and at least one score for a technical specification of the item based on survey data indicating the results of one or more surveys completed by at least one different user;
  for each of the items:
    applying a classifier which assigns predictive affinities to at least one technical specification for that item;
    determining, by the at least one processor and based on the search criteria, a predicted affinity of the user for that item; and
    generating a graph that includes:
      a user node corresponding to the user,
      one or more item nodes corresponding to the plurality of items, the user node being connected to each of the one or more item nodes by an edge that indicates the predicted affinity of the user for the corresponding item, and
      one or more criterion nodes corresponding to the one or more search criteria, the user node being connected to each of the one or more criterion nodes by an edge that indicates that the user specified the corresponding criterion in the search criteria, wherein the graph includes a connection between at least one criterion node and at least one item node by an edge that indicates the criteria score of the item represented by the at least one item node for the criteria represented by the at least one criterion node;
  determining, by the at least one processor, a set of recommendations including one or more of the items, the set of recommendations determined based at least partly on the graph;
  transmitting, by the at least one processor, the set of recommendations for presentation in the UI executing on the user device; and
  in response to receiving, from the user, user input that is responsive to the set of recommendations, applying the user input to refine the classifier.

2. The method of claim 1, wherein the set of recommendations is ordered according to the item score for each of the one or more items.

3. The method of claim 1, wherein determining the item score for the respective item further comprises:
calculating an average of the plurality of criteria scores that are included in the item profile for the respective item and that correspond to the one or more search criteria.

4. The method of claim 1,
wherein the user input indicates an affinity of the user for at least one of the items in the set of recommendations.

5. The method of claim 1, further comprising:
receiving, by the at least one processor, user input indicating an affinity of the user for one or more items;
determining, by the at least one processor, an association between the user and a second user based at least partly on an affinity of the second user for the one or more items; and
identifying, by the at least one processor, one or more other items for which the second user has indicated an affinity and for which the user has not indicated an affinity, and
wherein determining the set of recommendations is further based at least partly on the affinity of the second user for the one or more other items.

6. The method of claim 5,
wherein the graph includes:
a first user node corresponding to the user;
a second user node corresponding to the second user;
one or more first item nodes corresponding to the one or more items for which the user and the second user have indicated the affinity;
one or more second item nodes corresponding to the one or more other items for which the second user has indicated the affinity;
one or more first edges connecting the first user node to the one or more first item nodes to indicate the affinity of the user for the one or more items;
one or more second edges connecting the second user node to the one or more first item nodes and the one or more second item nodes to indicate the affinity of the second user for the one or more items and the one or more other items; and
a third edge connecting the first user node to the second user node, the third edge indicating an association between the user and the second user, and
wherein determining the set of recommendations is further based at least partly on the graph.

7. The method of claim 1, wherein the plurality of items includes at least one vehicle.

8. The method of claim 1, wherein determining the set of recommendations comprises adding the item to the set of recommendations based on the connection between at least one criterion node and at least one item node.

9. A system, comprising:
at least one processor; and
a memory communicatively coupled to the at least one processor, the memory storing instructions which, when executed by the at least one processor, cause the at least one processor to perform operations comprising:
receiving one or more search criteria specified by a user through a user interface (UI) executing on a user device, at least one of the search criteria expressing an emotion, mood, or lifestyle;
determining an item score for each of a plurality of items, the item score for a respective item being associated with the user and determined based on a correspondence between the one or more search criteria and a plurality of criteria scores for the respective item, wherein the plurality of criteria scores is accessed from an item profile that describes, for the respective item, the plurality of criteria scores for a plurality of criteria, and wherein the plurality of criteria scores include at least one score for an emotional or lifestyle aspect of the item and at least one score for a technical specification of the item based on survey data indicating the results of one or more surveys completed by at least one different user;
for each of the items:
applying a classifier which assigns predictive affinities to at least one technical specification for that item;
determining, based on the search criteria, a predicted affinity of the user for that item; and
generating a graph that includes:
a user node corresponding to the user,
one or more item nodes corresponding to the plurality of items, the user node being connected to each of the one or more item nodes by an edge that indicates the predicted affinity of the user for the corresponding item, and
one or more criterion nodes corresponding to the one or more search criteria, the user node being connected to each of the one or more criterion nodes by an edge that indicates that the user specified the corresponding criterion in the search criteria, wherein the graph includes a connection between at least one criterion node and at least one item node by an edge that indicates the criteria score of the item represented by the at least one item node for the criteria represented by the at least one criterion node;
determining a set of recommendations including one or more of the items, the set of recommendations determined based at least partly on the graph;
transmitting the set of recommendations for presentation in the UI executing on the user device; and
in response to receiving, from the user, user input that is responsive to the set of recommendations, applying the user input to refine the classifier.

10. The system of claim 9, wherein the set of recommendations is ordered according to the item score for each of the one or more items.

11. The system of claim 9, wherein determining the item score for the respective item further comprises:
calculating an average of the plurality of criteria scores that are included in the item profile for the respective item and that correspond to the one or more search criteria.

12. The system of claim 9,
wherein the user input indicates an affinity of the user for at least one of the items in the set of recommendations.

13. The system of claim 9, the operations further comprising:
receiving user input indicating an affinity of the user for one or more items;
determining an association between the user and a second user based at least partly on an affinity of the second user for the one or more items; and identifying one or more other items for which the second user has indicated an affinity and for which the user has not indicated an affinity, and wherein determining the set of recommendations is further based at least partly on the affinity of the second user for the one or more other items.

14. The system of claim 13, wherein the graph includes:

a first user node corresponding to the user;

a second user node corresponding to the second user;

one or more first item nodes corresponding to the one or more items for which the user and the second user have indicated the affinity;

one or more second item nodes corresponding to the one or more other items for which the second user has indicated the affinity;

one or more first edges connecting the first user node to the one or more first item nodes to indicate the affinity of the user for the one or more items;

one or more second edges connecting the second user node to the one or more first item nodes and the one or more second item nodes to indicate the affinity of the second user for the one or more items and the one or more other items; and a third edge connecting the first user node to the second user node, the third edge indicating an association between the user and the second user, and wherein determining the set of recommendations is further based at least partly on the graph.

15. The system of claim 9, wherein the plurality of items includes at least one vehicle.

16. The system of claim 9, wherein determining the set of recommendations comprises adding the item to the set of recommendations based on the connection between at least one criterion node and at least one item node.

17. One or more non-transitory computer-readable media storing instructions which, when executed by at least one processor, cause the at least one processor to perform operations comprising:

receiving one or more search criteria specified by a user through a user interface (UI) executing on a user device, at least one of the search criteria expressing an emotion, mood, or lifestyle;

determining an item score for each of a plurality of items, the item score for a respective item being associated with the user and determined based on a correspondence between the one or more search criteria and a plurality of criteria scores for the respective item, wherein the plurality of criteria scores is accessed from an item profile that describes, for the respective item, the plurality of criteria scores for a plurality of criteria, and wherein the plurality of criteria scores include at least one score for an emotional or lifestyle aspect of the item and at least one score for a technical specification of the item based on survey data indicating the results of one or more surveys completed by at least one different user;

for each of the items:

applying a classifier which assigns predictive affinities to at least one technical specification for that item;

determining, based on the search criteria, a predicted affinity of the user for that item; and generating a graph that includes:

a user node corresponding to the user, one or more item nodes corresponding to the plurality of items, the user node being connected to each of the one or more item nodes by an edge that indicates the predicted affinity of the user for the corresponding item, and one or more criterion nodes corresponding to the one or more search criteria, the user node being connected to each of the one or more criterion nodes by an edge that indicates that the user specified the corresponding criterion in the search criteria, wherein the graph includes a connection between at least one criterion node and at least one item node by an edge that indicates the criteria score of the item represented by the at least one item node for the criteria represented by the at least one criterion node;

determining a set of recommendations including one or more of the items, the set of recommendations determined based at least partly on the graph;

transmitting the set of recommendations for presentation in the UI executing on the user device; and in response to receiving, from the user, user input that is responsive to the set of recommendations, applying the user input to refine the classifier.

18. The media of claim 17, wherein determining the set of recommendations comprises adding the item to the set of recommendations based on the connection between at least one criterion node and at least one item node.

19. The media of claim 17, wherein determining the item score for the respective item further comprises:

calculating an average of the plurality of criteria scores that are included in the item profile for the respective item and that correspond to the one or more search criteria.

20. The media of claim 17, wherein the user input indicates an affinity of the user for at least one of the items in the set of recommendations.

* * * * *